UNITED STATES PATENT OFFICE.

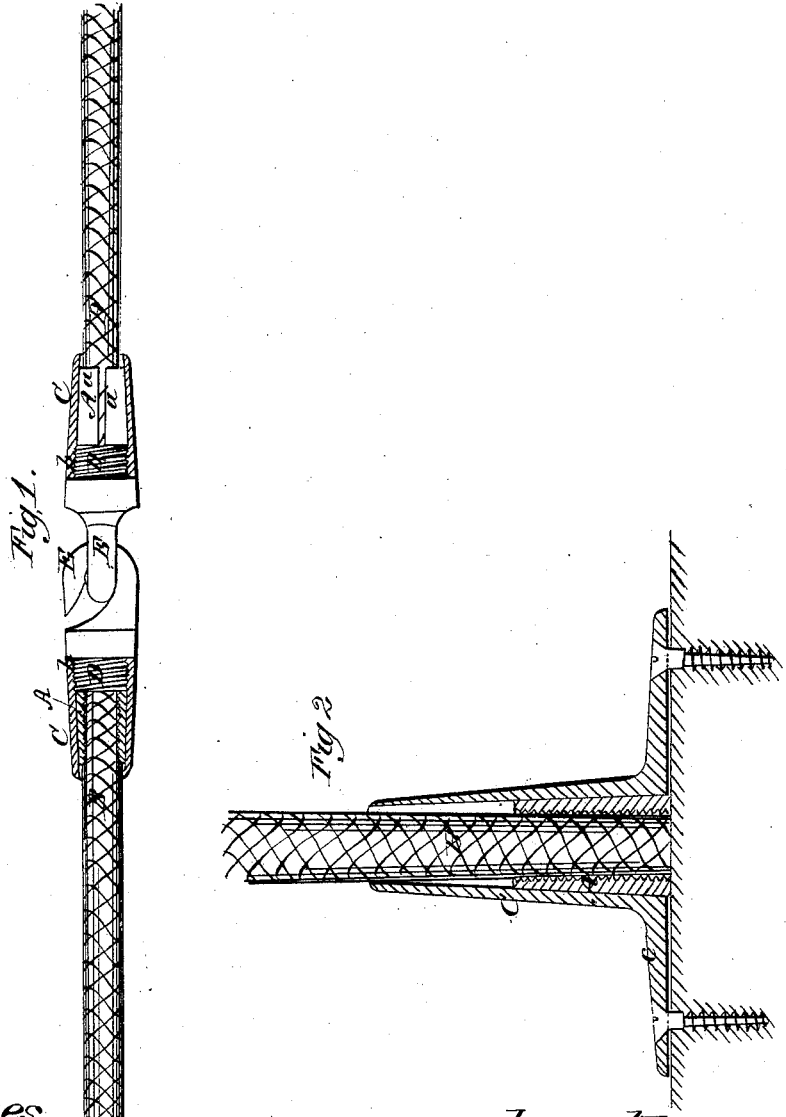

JAMES L. HOWARD, OF HARTFORD, CONNECTICUT.

IMPROVED COUPLING ATTACHMENT FOR CORDS, ROPES, &c.

Specification forming part of Letters Patent No. 27,906, dated April 17, 1860.

*To all whom it may concern:*

Be it known that I, JAMES L. HOWARD, of Hartford, in the county of Hartford and State of Connecticut, have invented a new and Improved Coupling and Attachment for Cords, Ropes, Round Belting, &c.; and I do hereby declare that the following is a full, clear, and exact description of the same, reference being had to the annexed drawings, making a part of this specification, in which—

Figure 1 is a side sectional view of my invention applied to a rope, cord, or round belt as a coupling. Fig. 2 is a side sectional view of the same applied as an attachment.

Similar letters of reference indicate corresponding parts in both figures.

The object of this invention is to obtain a simple and efficient means for connecting together the ends of ropes, cords, or round belts, and also for attaching the same to any fixture.

The invention consists in the employment or use of a divided screw or corrugated or smooth conical tube, which embraces the end of the rope, cord, or belt, and fitted in them is a conical socket, as hereinafter described.

To enable those skilled in the art to fully understood and construct my invention, I will proceed to describe it.

A, Figs. 1 and 2, represents conical tubes, which are formed of two longitudinal equal parts $a\ a$, corrugated or provided at their inner sides with a screw-thread. The external surfaces of the tubes A are of conical form, the interior being of equal diameter throughout. The tubes A encompass the ends B B of the cords, ropes, or round belts to be connected together, (see Fig. 1,) and each tube A is encompassed by a socket C, which internally is of conical form corresponding to the exterior of the tubes A. The outer parts of the socket C (see Fig. 1) have screw-threads $b$ cut in them to receive screw-plugs D, which, on being screwed into the sockets, force the tubes A therein and cause the two parts $a\ a$ thereof to firmly grasp the ends of the cords or ropes, the compression of the parts $a\ a$ of the tubes being due to the conical form of the sockets and tubes. The outer ends of the screw-plugs are provided with hooks E.

The hooks E E, it will be seen, form the direct connection, the screw-plugs D D attaching the former to the sockets C C, the latter being secured to the tubes A by the conical form of both and the tubes secured to the ends of the cords or ropes by the compression of the parts $a\ a$ on the cords or ropes obtained by the forcing inward of the tubes into the sockets by the screw-plugs, the corrugations or screw-threads in the tubes A preventing any slipping of the same on the cords or ropes.

In cases where a cord or rope is to be attached to a fixture—such as a post, wall, and the like—the screw-plug D is not necessary. All that is required in the latter case is to provide the socket C with a flange $c$ and have the tube A within it of sufficient length to be forced inward by screwing the flange $c$ to the fixture. This will be fully understood by referring to Fig. 2. The internal surfaces of the tubes A may be smoothed; but corrugated surfaces would be preferable.

Having thus described my invention, what I claim as new, and desire to secure by Letters Patent, is—

The employment of the tubes A in combination with the rope or belt and the socket C, substantially as and for the purposes herein shown and described.

JAMES L. HOWARD.

Witnesses:
E. N. SHIPMAN,
C. F. HOWARD.